United States Patent
Shiomi

(10) Patent No.: US 11,223,281 B2
(45) Date of Patent: Jan. 11, 2022

(54) RECTIFIER CIRCUIT AND POWER SUPPLY UNIT

(71) Applicant: Sharp Kabushiki Kaisha, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 25 days.

(21) Appl. No.: 16/787,273

(22) Filed: Feb. 11, 2020

(65) Prior Publication Data
US 2020/0266711 A1    Aug. 20, 2020

(30) Foreign Application Priority Data
Feb. 19, 2019   (JP) ............................... JP2019-027560

(51) Int. Cl.
*H02M 3/158* (2006.01)

(52) U.S. Cl.
CPC ................................. *H02M 3/1588* (2013.01)

(58) Field of Classification Search
CPC ...... H02M 3/1588; H02M 3/335; H02M 3/07; H02M 3/158; H02M 7/217; H02M 1/00; H02M 1/0051
See application file for complete search history.

(56) References Cited

U.S. PATENT DOCUMENTS

| | | | |
|---|---|---|---|
| 8,890,496 B2 * | 11/2014 | Inoue | H02M 3/158 323/271 |
| 10,389,351 B2 * | 8/2019 | Sakai | H03K 17/08142 |
| 2007/0230228 A1 * | 10/2007 | Mao | H02M 3/33592 363/89 |
| 2009/0206812 A1 * | 8/2009 | Sasaya | H03K 17/08142 323/282 |
| 2015/0288290 A1 * | 10/2015 | Iwamoto | H01F 38/02 363/21.06 |
| 2017/0104416 A1 * | 4/2017 | Kataoka | H03K 17/162 |
| 2017/0373592 A1 * | 12/2017 | Takahashi | H02M 3/156 |
| 2018/0316256 A1 * | 11/2018 | Cyr | H02M 3/158 |
| 2020/0266726 A1 * | 8/2020 | Shiomi | H02M 7/217 |
| 2021/0028706 A1 * | 1/2021 | Shiomi | H02M 3/1588 |

FOREIGN PATENT DOCUMENTS

| | | |
|---|---|---|
| JP | 2011-036075 A | 2/2011 |
| JP | 2013-198298 A | 9/2013 |

* cited by examiner

*Primary Examiner* — Rafael O De Leon Domenech
(74) *Attorney, Agent, or Firm* — Keating & Bennett, LLP

(57) ABSTRACT

The present disclosure, in an aspect thereof, has an object to effectively reduce transient current in a rectifier circuit. In a rectifier circuit, a current flows from a power supply to a coil when a transistor is turned on. Then, when the transistor is turned off, a second rectifier current flows from the coil to a second rectifier.

12 Claims, 5 Drawing Sheets

RECTIFIER CIRCUIT AND POWER SUPPLY UNIT

TECHNICAL FIELD

The following disclosure relates to rectifier circuits.

BACKGROUND ART

It is known that a transient current can occur in a rectifier used in power supply circuits. Transient current is generated when a reverse voltage is applied to inhibit a current in the rectifier. Various solutions have been studied because the transient current causes loss in the power supply circuit.

Patent Literature 1 (Japanese Unexamined Patent Application Publication, Tokukai, No. 2011-36075) and Patent Literature 2 (Japanese Unexamined Patent Application Publication, Tokukai, No. 2013-198298) disclose a circuit one of the purposes of which is to reduce transient current. The circuit disclosed in Patent Literature 1, as an example, includes a diode and a transformer that are connected in parallel with a rectifier to reduce transient current.

Patent Literature 2 discloses a similar circuit.

SUMMARY OF INVENTION

Technical Problem

There is still room for improvement in the technique of reducing transient current in a rectifier circuit as will be described later in detail. The present disclosure, in an aspect thereof, has an object to effectively reduce transient current in a rectifier circuit.

Solution to Problem

To achieve the object, the present disclosure, in an aspect thereof, is directed to a rectifier circuit causing a rectification current to flow from a second terminal to a first terminal, the rectifier circuit including: a third terminal between the first terminal and the second terminal; a first rectifier connected to the first terminal and the second terminal; a second rectifier connected to the first terminal and the third terminal; a coil connected to the third terminal and the second terminal; a transistor having a drain or collector connected to the third terminal; and a power supply having a positive terminal connected to the second terminal and a negative terminal connected to a source or emitter of the transistor.

Advantageous Effects of Invention

The present disclosure, in an aspect thereof, provides a rectifier circuit that can effectively reduce transient current.

Figure 4:
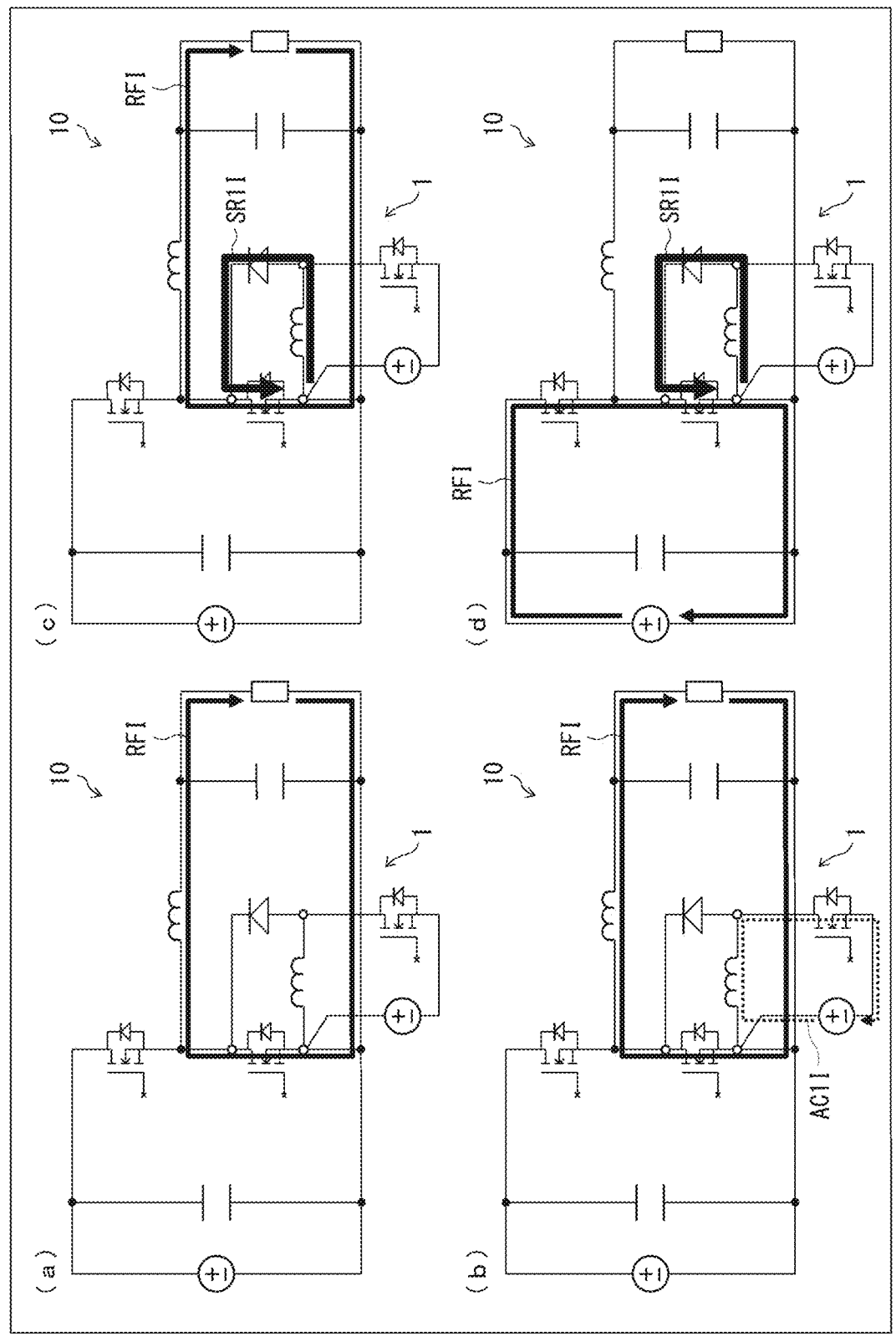

Portions (a) to (d) of FIG. 4 are diagrams showing current paths in first to fourth steps respectively.

Figure 5:
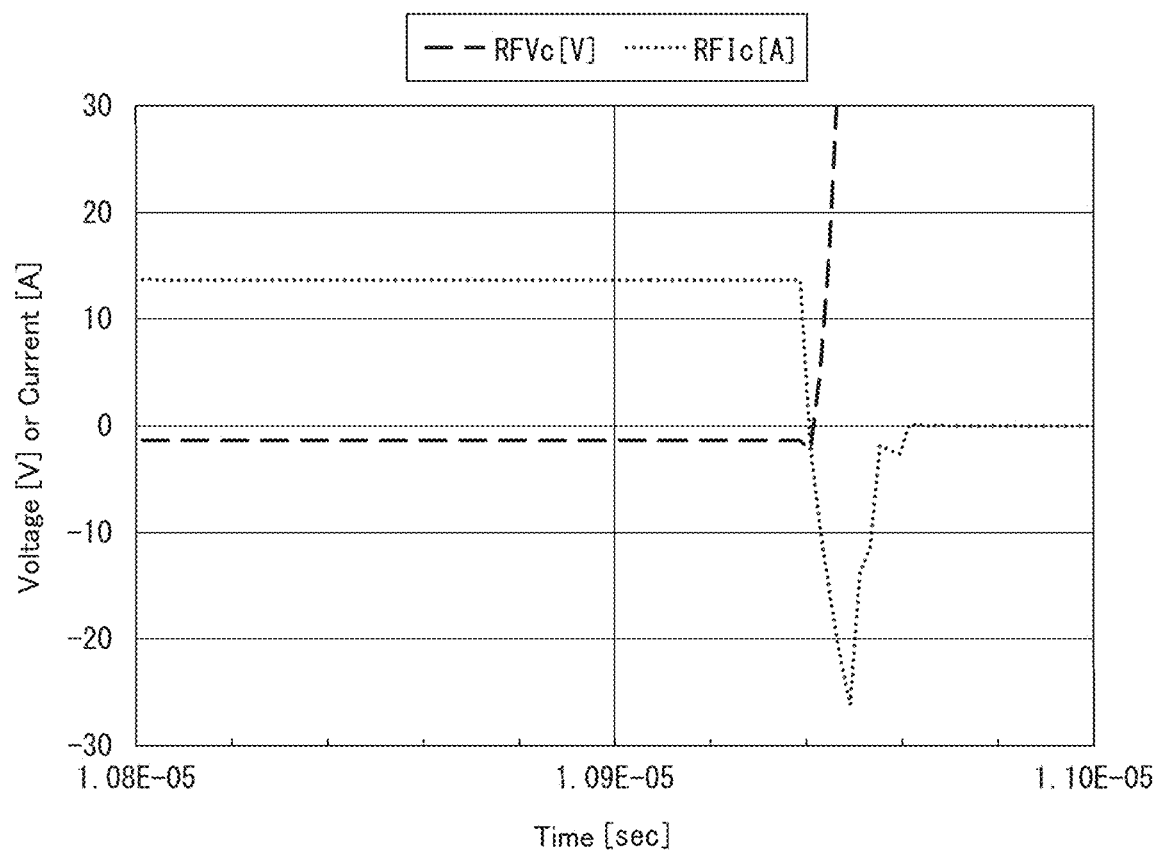

FIG. 5 is a diagram of voltage and current waveforms in a power supply circuit in accordance with a comparative example.

Figure 6:
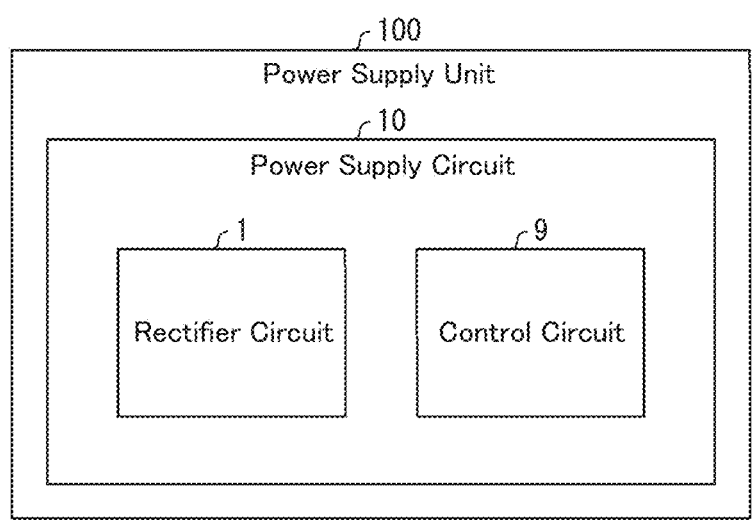

FIG. 6 is a diagram of a power supply unit in accordance with Embodiment 2.

DESCRIPTION OF EMBODIMENTS

Embodiment 1

The following will describe a rectifier circuit 1 and a power supply circuit 10 in accordance with Embodiment 1. For convenience of description, members of Embodiment 2 and any subsequent embodiments that have the same function as members described in Embodiment 1 will be indicated by the same reference numerals, and description thereof is omitted.

Purpose of Rectifier Circuit 1

Transient current occurs in a rectifier as described earlier. It is known that a transient current can primarily occur in a rectifier having a PN junction.

SiC-SBD's (Schottky barrier diodes) and GaN HEMT's (high electron mobility transistors) are examples of semiconductor devices with no PN junctions. In these semiconductor devices, no transient current occurs that is attributable to a PN junction. However, charge current for parasitic capacitance under a reverse voltage flows as a transient current. The rectifier circuit 1 has been created for the purpose of reducing these transient currents.

Definition of Terms

Various terms used in the present specification are defined in the following prior to a description of the rectifier circuit 1.

A forward voltage is a voltage generating a forward current in a rectifier.

Consider, as a first example, a situation where the rectifier is a diode. A forward voltage in such a situation is a voltage applied to generate a forward current in the diode.

Consider, as a second example, a situation where the rectifier is a transistor. A forward voltage in such a situation is a voltage at which a rectification current flows with the gate being turned off and the source being placed under a positive voltage with reference to the drain.

These two examples are equivalent to applying, to a second terminal ST1 (detailed later) of the rectifier circuit 1, a positive voltage with reference to a first terminal FT1 (detailed later) of the rectifier circuit 1. The magnitude of the forward voltage varies depending on the device type and is, for example, from 0.1 V to 5 V. The magnitude of the forward current generated under a forward voltage varies depending on the current in a coil and other like inductive device and is, for example, from 0.1 A to 100 A.

A rectification current is a forward current in a rectifier or a rectifier circuit.

A reverse voltage is a voltage applied to a rectifier or a rectifier circuit so that the rectifier or the rectifier circuit does not conduct in the forward direction.

Consider, as a first example, a situation where the rectifier is a diode. A reverse voltage in such a situation is a voltage applied so that no forward current can flow in the diode.

Consider, as a second example, a situation where the rectifier is a transistor. A reverse voltage in such a situation is a positive voltage, with reference to the source, applied to the drain with the gate being turned off.

These two examples are equivalent to applying, to FT1 of the rectifier circuit 1, a positive voltage with reference to ST1 of the rectifier circuit 1. The magnitude of the reverse voltage varies depending on circuit specifications and is, for example, from 1 V to 1,200 V.

A transient current is a collective term for reverse recovery current and charge current for parasitic capacitance of a rectifier. In other words, a transient current is an instantaneous current generated when a reverse voltage is applied to the rectifier. Transient current can be measured at FS1 and SS1 in the example shown in FIG. 1.

A rectification function is a function to cause a monodirectional current flow, but no bidirectional current flow.

Consider, as a first example, a situation where the rectifier is a diode. A rectification function in such a situation is a function of the diode allowing a forward current and blocking a reverse current.

Consider, as a second example, a situation where the rectifier is a transistor. A rectification function in such a situation is a function to allow a current from the source to the drain and block a current from the drain to the source, with the gate being turned off.

A rectifier is a collective term for devices capable of the rectification function.

A transistor function is a function of a transistor switching on/off a current flow from the drain to the source by turning on/off the gate. Needless to say, the drain needs to be biased positively relative to the source to allow a current flow.

When the device is a bipolar transistor or an IGBT (insulated gate bipolar transistor), the same definitions apply by (i) reading the drain as the collector and (ii) the source as the emitter.

A transistor device is a collective term for devices with the transistor function.

Brief Description of Structure of Power Supply Circuit 10

Figure 1:
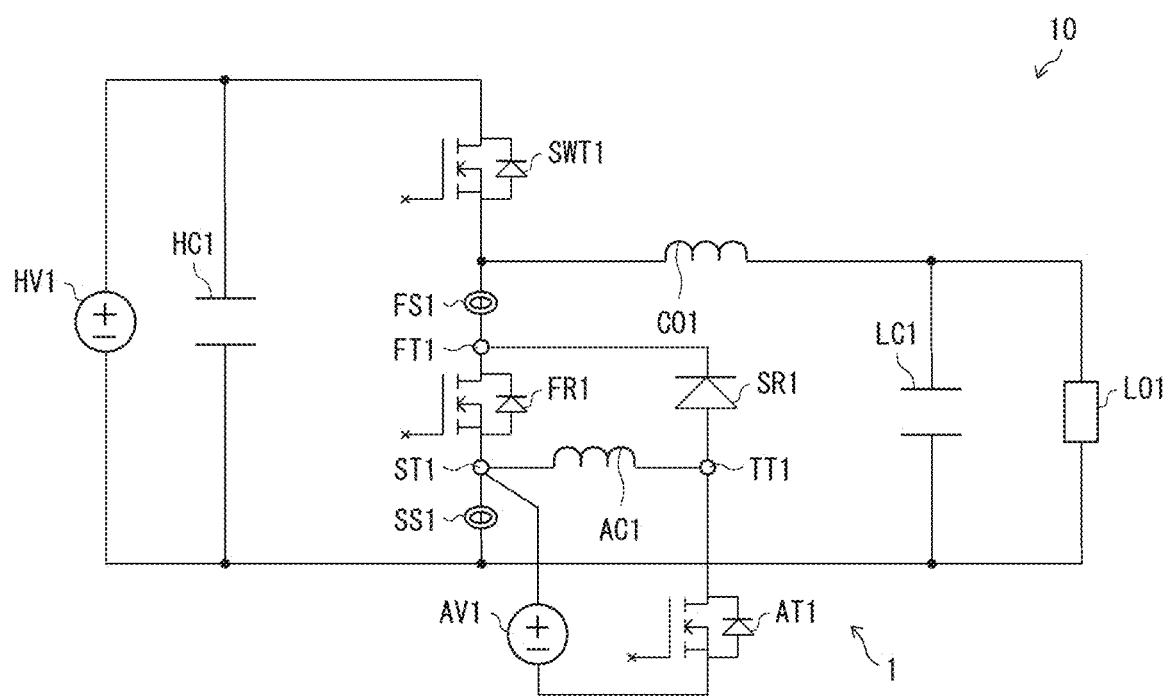
FIG. 1 is a circuit diagram of a power supply circuit in accordance with Embodiment 1.

FIG. 1 is a circuit diagram of the power supply circuit 10 in accordance with Embodiment 1. The power supply circuit 10 is a step-down DC/DC converter that steps down high voltage to low voltage. The power supply circuit 10 includes the rectifier circuit 1 in place of a rectifier in a publicly known step-down DC/DC converter. The following description includes numerical values for illustrative purposes only.

Structure of High-voltage Section of Power Supply Circuit 10

The high-voltage section includes a power supply HV1 and a capacitor HC1. The following description may include abbreviated notation, for example, "HV1" for "power supply HV1" for convenience of description. HV1 supplies a voltage of 400 V. HC1 has a capacitance of 3.3 mF. The side of a power supply symbol marked with "+" indicates a positive terminal of the power supply, whereas the side marked with "−" indicates a negative terminal of the power supply. HV1 has a negative terminal voltage of 0 V.

Structure of Low-voltage Section of Power Supply Circuit 10

The low-voltage section includes a coil CO1, a capacitor LC1, and a load LO1. CO1 has an inductance of 500 pH and an average current of 14 A. There is a voltage of 200 V across LC1. The power supply circuit 10 is designed so that the voltage across LC1 is half that across HC1.

Structure of Rectifier Circuit 1 of Power Supply Circuit 10

A typical rectifier circuit includes a first rectifier FR1. In contrast, apart from a first rectifier FR1, the rectifier circuit 1 additionally includes a second rectifier SR1, a coil AC1, a transistor AT1, and a power supply AV1.

The first rectifier FR1 is a cascode GaN HEMT. FR1 has a drain breakdown voltage of 650 V and an ON resistance of 50 mΩ. The example shown in FIG. 1 uses the same schematic symbol as a MOSFET (metal-oxide semiconductor field-effect transistor) to represent a cascode GaN HEMT.

The second rectifier SR1 is a SiC-SBD with a breakdown voltage of 650 V. SR1 allows a forward voltage of 0.9 V upon starting to conduct and a resistance of 50 mΩ while conducting in the forward direction.

The coil AC1 is a coil with an inductance of 1 μH and a DC resistance of 50 mΩ.

The transistor AT1 is a MOSFET with an ON resistance of 40 mΩ.

The power supply AV1 is a 15-V power supply. AV1 has a positive terminal connected to ST1. In Embodiment 1, AV1 has a negative terminal voltage of −15 V because ST1 is at 0 V. AV1 has a negative terminal connected to the source of AT1.

The first terminal FT1 provides an electrical connection between FR1 and SR1.

The second terminal ST1 provides an electrical connection between FR1, AC1, and AV1.

A third terminal TT1 provides an electrical connection between SR1, AC1, and AT1.

"FS1" and "SS1" denote points where current can be measured in the rectifier circuit 1. FS1 and SS1 will give equal current measurements. Any current sensor may be used including a hole-element type current sensor, a CT (current transformer) sensor, a Rogowski coil, and a shunt resistance system.

Structure of Transistor Function Section of Power Supply Circuit 10

The transistor function section includes a transistor SWT1.

Each device in the power supply circuit 10 has a gate terminal connected to a control circuit 9 shown in FIG. 6 (detailed later), so that the gates can be turned on and off by the control circuit 9.

Structure of Power Supply Circuit as Comparative Example

A step-down DC/DC converter as a comparative example (hereinafter, a "power supply circuit") will be described first in detail in terms of a relationship between its operation and transient current. The power supply circuit is built around a common rectifier described above.

Operation 1 of Comparative Example

First, the switch node is at a voltage of approximately 400 V while SWT1 is ON. CO1 is therefore placed under a voltage of approximately 200 V, thereby increasing the coil current. The coil current flows following a path, HV1 (positive terminal)→SWT1→CO1→LO1→HV1 (negative terminal).

Operation 2 of Comparative Example

Next, SWT1 is turned off. The electromotive force of CO1 consequently places ST1 at a higher voltage than FT1 by approximately 1 V. This voltage of approximately 1 V is applied to FR1 as a forward voltage, generating a rectification current flowing from FR1 to CO1. The rectification current flow following a path, LO1→FR1→CO1→LO1.

Operation 3 of Comparative Example

Subsequently, SWT1 is turned on, which changes the voltage at the switch node to approximately 400 V. A reverse voltage of approximately 400 V is therefore applied to PR1, thereby generating a transient current.

This set of operations 1 to 3 is repeatedly performed at a frequency of 100 kHz. SWT1 has a duty ratio of 50%. FR1 is therefore placed alternately under a forward voltage and a reverse voltage every 5 psec.

Figure 2:
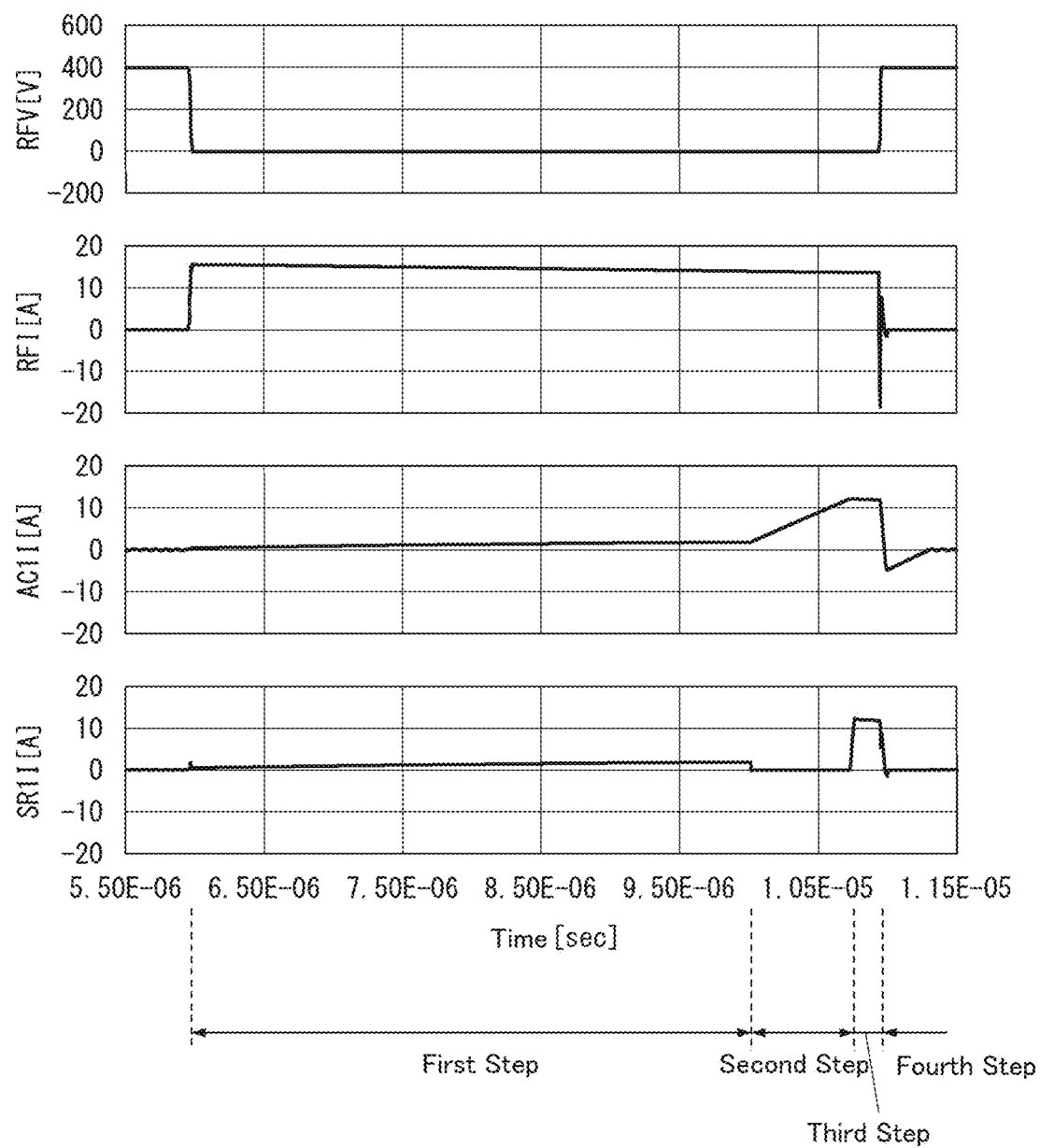
FIG. 2 is a set of diagrams of voltage and current waveforms.
Figure 3:
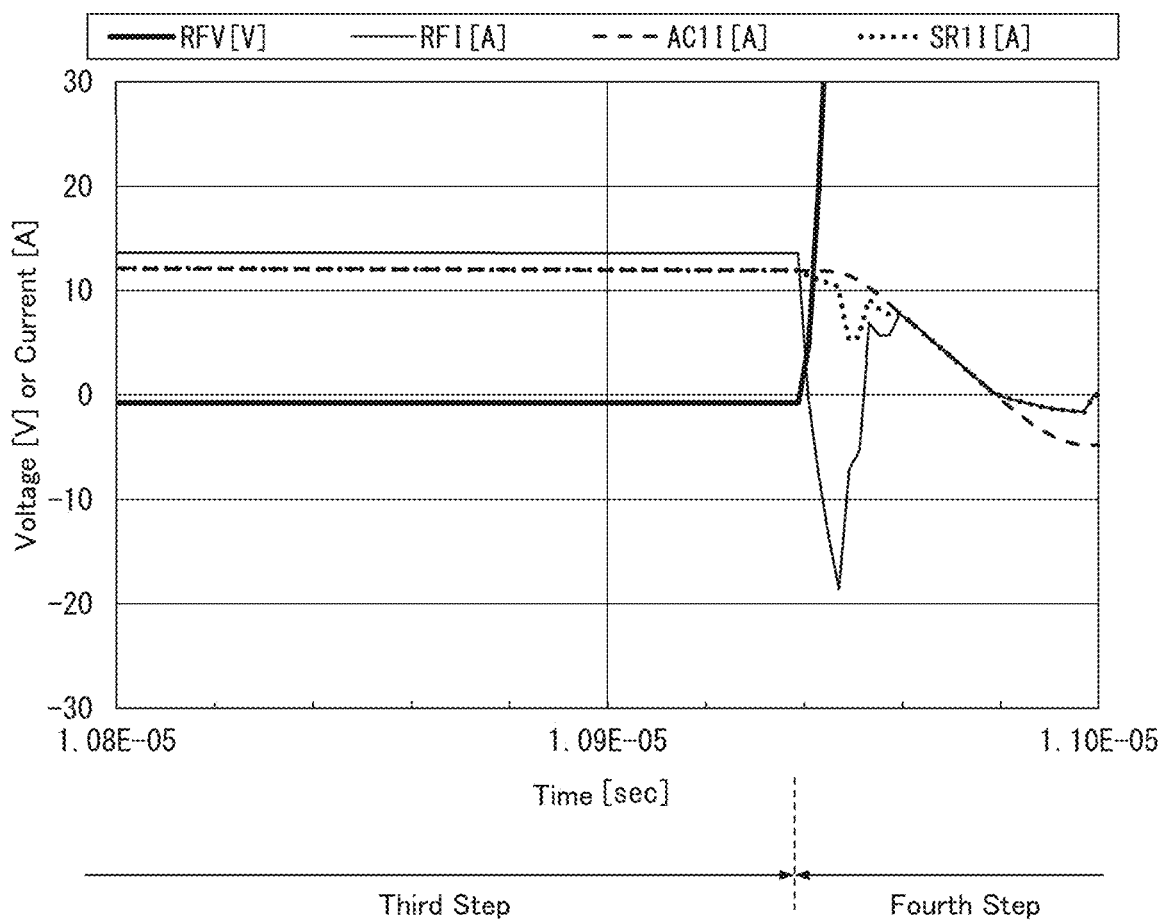
FIG. 3 is a diagram collectively showing the graphs in FIG. 2 on an enlarged scale.

Description of FIGS. 2 to 4 Illustrating Operations of Rectifier Circuit 1

FIG. 2 is a set of graphs representing four voltage and current waveforms in the rectifier circuit 1. All the waveforms are drawn on a common time axis (horizontal axis). The four waveforms represent:

RFV (voltage across the rectifier circuit 1), which is a voltage applied to FT1 relative to ST1;

RFI (current through the rectifier circuit 1), which is a current flowing from ST1 to FT1;

AC1I (current through AC1), which is a current flowing from ST1 to TT1; and

SR1I (current through SR1), which is a current flowing from TT1 to FT1.

FIG. 2 shows, on its horizontal axis, timings for first to fourth steps (detailed later). SR1I may alternatively be referred to as the second rectifier current.

FIG. 3 is a diagram collectively showing the graphs of the four waveforms in FIG. 2 in a single graph on an enlarged scale. FIG. 3 shows RFV rising beyond the top of the graph for convenience in drawing the waveforms on an enlarged scale.

FIG. 4 is a set of diagrams showing current paths in the first to fourth steps. Specifically, portions (a) to (d) of FIG. 4 represent current paths in the first to fourth steps respectively. FIG. 4 omits some of the reference numerals and symbols shown in FIG. 1 for convenience.

How Rectifier Circuit 1 Is Driven: First to Fourth Steps

According to a method of driving the rectifier circuit 1, the following four steps are performed in this sequence:

A first step of applying a forward voltage across the rectifier circuit 1 to generate a rectification current;

A second step of turning on AT1 to generate a current flowing through AC1;

A third step of turning off AT1 to generate a current flowing through SR1; and

A fourth step of applying a reverse voltage across the rectifier circuit 1 to stop the rectification current.

First Step: Generating Rectification Current Flowing through Rectifier Circuit 1

Prior to the first step, current is flowing from SWT1 to CO1. SWT1 is accordingly turned off in the first step, thereby generating in CO1 an electromotive force that in turn leads to the application of a forward voltage of approximately 1 V across the rectifier circuit 1 and the generation of a rectification current flowing through FR1. The rectification current flows following the path shown in (a) of FIG. 4.

The current through SR1 is smaller than the current through FR1 in the first step. SR1I, which is shown in (c) to (d) of FIG. 4, is omitted in (a) of FIG. 4 for this reason.

Second Step: Generating Current Flowing Through AC1

Subsequent to the first step, AT1 is turned on, thereby generating AC1I to flow. AC1I flows following the path shown in (b) of FIG. 4. AC1I increases more or less linearly with time. The coil accumulates energy in this second step.

Third Step: Generating Current Flowing through SR1

Subsequent to the second step, AT1 is turned off, thereby generating SR1I to flow. SR1I flows following the path shown in (c) of FIG. 4. In other words, the energy accumulated in the coil transforms into SR1I.

The path followed by SR1I may be described from a different point of view. A description will be given particularly of the current through FR1 in (c) of FIG. 4. FIG. 4 shows both RFI and SR1I for FR1. RFI denotes a current flowing upward in FR1, whereas SR1I denotes a current flowing downward in FR1. These currents, flowing in opposite directions through FR1, cancel each other at least to some extent.

Fourth Step: Applying Reverse Voltage across Rectifier Circuit 1

In the fourth step, SWT1 is turned on, thereby applying a reverse voltage across the rectifier circuit 1. The reverse voltage may be applied by one of various methods available in accordance with the type of the power supply circuit.

A transient current (RFI in the reverse direction) flows simultaneously with the application of the reverse voltage, charging the parasitic capacitance of FR1. The transient current flows following the path denoted by RFI in (d) of FIG. 4. There is another current (not shown in (d) of FIG. 4) that flows following a path, HV1 (positive terminal) →SWT1→CO1→LO1→HV1 (negative terminal), since the start of the fourth step.

Theoretical Basis for Transient Current Reduction by FR1I

In the rectifier circuit 1, a reverse voltage is applied, generating a transient current, while SR1I is flowing following such a path as to charge the parasitic capacitance of FR1. In other words, the parasitic capacitance of FR1 can be charged by SR1I and RFI. The transient current hence decreases by as much as SR1I. Accordingly, the transient current can be effectively reduced over conventional techniques.

Transient-Current Reducing Effect

Referring to FIGS. 3 and 5, a description will be given of a transient-current reducing effect of the rectifier circuit 1. FIG. 5 is a graph representing the waveforms of a rectifier circuit voltage (RFVc) and a rectifier circuit current (RFIc) in the power supply circuit. The horizontal and vertical axes of the graph in FIG. 5 have the same scale as those in the graph in FIG. 3.

Transient Current in Comparative Example

Referring to FIG. 5, transient current is now described that occurs in a rectifier circuit of the power supply circuit. In the comparative example, a transient current (negative RFIc) flows when a reverse voltage (RFVc) of 400 V is applied. FIG. 5 does not show voltages in excess of 30 V due to the scale constraints of the vertical axis. RFVc however reaches 400 V, thereby generating a transient current of approximately 28 A in the power supply circuit.

Transient Current in Rectifier Circuit 1

Referring to FIG. 3, transient current is now described that occurs in the rectifier circuit 1. In the rectifier circuit 1, a reverse voltage (RFV) of 400 V is applied similarly to the comparative example. The transient current (negative RFI) is however approximately 19 A in the rectifier circuit 1, which demonstrates that the rectifier circuit 1 can reduce transient current over the comparative example.

Features 1 to 4 for Efficient Operation of Rectifier Circuit 1

Embodiment 1 has desirable features as detailed in the following.

Feature 1: Generating SR1I While Rectification Current is Flowing in Rectifier Circuit 1

SR1I is used to reduce a transient current as mentioned above. It is therefore also important to restrain attenuation of SR1I until a transient current starts flowing. SR1I flows while a rectification current is flowing in the rectifier circuit 1 in Embodiment 1. When current is flowing in the rectifier circuit 1, the voltage at FT1 relative to ST1 theoretically decreases as much as the voltage drop across PRE Meanwhile, SR1I flows from ST1 to FT1 through AC1 and SR1. In other words, current flows from ST1 where voltage is higher to FT1 where voltage is lower, which restrains attenuation of SR1I.

Feature 2: Generating Sufficient Magnetic Energy through Voltage Drop across FR1

SR1I is used to reduce a transient current as mentioned above. Efficient increases in SR1I therefore will lead to further reduction in transient current. The rectifier circuit 1 is so modified in Embodiment 1 as to more efficiently generate a large SR1I flow.

Specifically, in Embodiment 1, the voltage drop that occurs across FR1 due to the current flow from ST1 to FT1 is specified to be larger than the voltage drop that occurs when SR1 starts to conduct.

This specification enables generating a current that flows in AC1 via SR1 while there is a current flowing through FR1. This current can be checked by observing AC1I in FIG. 2. In the example shown in FIG. 2, there is FR1I of approximately 2 A flowing at time 1.00E-5 sec. It is thus understood that AC1I increases from approximately 2 A, not from 0 A, in the second step.

Feature 3: Voltage of AV1 Being Lower than Reverse Voltage

The voltage of AV1 is preferably low because AT1 causes switching loss. No reverse voltage (400 V) is used in Embodiment 1. Instead, AV1 is used which is a voltage source for a lower voltage. This arrangement can reduce switching loss caused by AT1.

The voltage of AV1 is specified to be lower than or equal to 20 V which is a rated voltage of the control terminal (gate terminal) of AT1. This specification enables the use of AV1 as a gate-driving power supply for AT1. The control circuit 9 in FIG. 6 includes a built-in gate-driving power supply for AT1.

Meanwhile, the voltage of AV1 preferably has such a value (at least 5 V) that a transistor (e.g., AT1) can operate in its saturation region, in order to reduce conductance loss in AT1.

AV1 is higher than or equal to 5 V and is lower than the reverse voltage in Embodiment 1. In addition, AV1 is lower than the rated voltage of the control terminal of AT1.

Variation Examples: Variations of Devices

In Embodiment 1, FR1 is a cascode GaN HEMT, and SR1 is a SiC-SBD. These devices are not limited in any particular manner so long as they fall in one of the above-described device types. Likewise, SWT1 is not limited to any particular type so long as it has a transistor function. The rectifier can have its conductance loss reduced by employing commonly used synchronized rectification.

Embodiment 2

The rectifier circuit in accordance with an aspect of the present disclosure is applicable to power supply circuits provided with a rectifier circuit. Examples of such a power supply circuit include a chopper circuit, an inverter circuit, and a PFC (power factor correction) circuit.

FIG. 6 is a diagram of a power supply unit 100 including a power supply circuit 10. The rectifier circuit 1 is capable of reducing loss in the power supply circuit 10 and the power supply unit 100. The power supply circuit 10 further includes a control circuit 9. The control circuit 9 controls the turning-on/off of each device in the power supply circuit 10. The control circuit 9 in particular includes a built-in gate-driving power supply (voltage: 15 V) for turning on/off AT1. The gate-driving power supply is connected to AV1. The first to fourth steps may be performed by the control circuit 9 controlling the turning-on/off of each device in the power supply circuit 10.

General Description

The present disclosure, in aspect 1 thereof, is directed to a rectifier circuit causing a rectification current to flow from a second terminal to a first terminal, the rectifier circuit including: a third terminal between the first terminal and the second terminal; a first rectifier connected to the first terminal and the second terminal; a second rectifier connected to the first terminal and the third terminal; a coil connected to the third terminal and the second terminal; a transistor having a drain or collector connected to the third terminal; and a power supply having a positive terminal connected to the second terminal and a negative terminal connected to a source or emitter of the transistor.

A transient current causes a loss in a circuit as described above. In view of this phenomenon, the inventor of the present application has reached this structure from a concept that a coil's energy can contribute to restraints of transient current.

In the structure, a current flows in the coil when the transistor is turned on, enabling the coil to accumulate energy. Then when the transistor is turned off, the energy is converted to a second rectifier current. The transient current is thereby reduced The second rectifier current serves to cause a current component that can be a transient current to flow in the path formed by the coil, the second rectifier, and the first rectifier.

In the rectifier circuit of aspect 2 of the present disclosure, a reverse voltage is applied to the rectifier circuit while a rectification current is flowing in the second rectifier.

This structure can reduce the current component that can be a transient current by means of the second rectifier current flowing at that time.

In the rectifier circuit of aspect 3 of the present disclosure, a rectification current starts flowing in the second rectifier while a rectification current is flowing in the first rectifier.

In this structure, the rectification current goes through a voltage drop across the first rectifier. In other words, voltage is higher at the second terminal than at the first terminal. The second rectifier current therefore readily and hence continuously flows from the second terminal to the first terminal.

In the rectifier circuit of aspect 4 of the present disclosure, a voltage drop across the first rectifier that occurs while a rectification current is flowing in the first rectifier is larger than a voltage drop across the second rectifier that occurs when the second rectifier starts conducting.

This structure enables a current to flow to the coil via the second rectifier while there is a current flowing in the first rectifier. The coil can hence accumulate energy.

In the rectifier circuit of aspect 5 of the present disclosure, the power supply supplies a voltage lower than the reverse voltage.

This structure enables switching of the transistor using a low voltage, thereby reducing switching loss in the transistor.

The present disclosure, in aspect 6 thereof, is directed to a power supply unit including the rectifier circuit of any aspect of the present disclosure.

According to this structure, the use of the rectifier circuit in which transient current is reduced realizes a power supply unit in which loss is reduced.

Additional Remarks

The present disclosure, in an aspect thereof, is not limited to the description of the embodiments above and may be altered within the scope of the claims. Embodiments based on a proper combination of technical means disclosed in different embodiments are encompassed in the technical scope of the aspect of the present disclosure. Furthermore, a new technological feature can be created by combining different technological means disclosed in the embodiments.

REFERENCE SIGNS LIST

1 Rectifier Circuit
9 Control Circuit
10 Power Supply Circuit
100 Power Supply Unit
FR1 First Rectifier
SR1 Second Rectifier
FT1 First Terminal
ST1 Second Terminal
TT1 Third Terminal
AC1 Coil
AT1 Transistor
AV1 Power Supply

What is claimed is:

1. A rectifier circuit comprising:
 a first rectifier;
 a second rectifier including a cathode connected to a cathode or a drain of the first rectifier;
 a coil including a first end connected to the anode or the source of the first rectifier and a second end connected to an anode of the second rectifier;
 a first transistor including a drain or collector connected to the anode of the second rectifier and the second end of the coil; and
 a first power supply including a positive terminal connected to the first end of the coil and the anode or the source of the first rectifier and a negative terminal connected to a source or emitter of the first transistor.

2. The rectifier circuit according to claim 1, wherein a reverse voltage is applied to the rectifier circuit while a rectification current is flowing in the second rectifier.

3. The rectifier circuit according to claim 1, wherein a rectification current starts flowing in the second rectifier while a rectification current is flowing in the first rectifier.

4. The rectifier circuit according to claim 2, wherein a rectification current starts flowing in the second rectifier while a rectification current is flowing in the first rectifier.

5. The rectifier circuit according to claim 1, wherein a voltage drop across the first rectifier that occurs while a rectification current is flowing in the first rectifier is larger than a voltage drop across the second rectifier that occurs when the second rectifier starts conducting.

6. The rectifier circuit according to claim 2, wherein a voltage drop across the first rectifier that occurs while a rectification current is flowing in the first rectifier is larger than a voltage drop across the second rectifier that occurs when the second rectifier starts conducting.

7. The rectifier circuit according to claim 3, wherein a voltage drop across the first rectifier that occurs while a rectification current is flowing in the first rectifier is larger than a voltage drop across the second rectifier that occurs when the second rectifier starts conducting.

8. The rectifier circuit according to claim 4, wherein a voltage drop across the first rectifier that occurs while a rectification current is flowing in the first rectifier is larger than a voltage drop across the second rectifier that occurs when the second rectifier starts conducting.

9. The rectifier circuit according to claim 2, wherein the first power supply supplies a voltage lower than the reverse voltage.

10. A power supply unit comprising the rectifier circuit according to claim 1.

11. The rectifier circuit according to claim 1, wherein
 the first rectifier is connected in series with a second transistor, and
 a second power supply, the second transistor, and the first rectifier are connected in series in this sequence.

12. The rectifier circuit according to claim 1, wherein the first rectifier includes a MOSFET or a GaN HEMT.

* * * * *